United States Patent [19]

Chittineni

[11] Patent Number: 4,841,444
[45] Date of Patent: Jun. 20, 1989

[54] METHOD FOR CONTINUOUS ESTIMATION BY NON-LINEAR SIGNAL MATCHING OF SEISMIC TRACES

[75] Inventor: Chittibabu Chittineni, Ponca City, Okla.

[73] Assignee: Conoco Inc., Ponca City, Okla.

[21] Appl. No.: 253,353

[22] Filed: Sep. 30, 1988

Related U.S. Application Data

[63] Continuation of Ser. No. 831,382, Feb. 20, 1986, abandoned.

[51] Int. Cl.⁴ .......................... G01V 1/36; G06K 9/48
[52] U.S. Cl. ........................... 364/421; 382/16; 367/38
[58] Field of Search ............... 364/420, 421; 382/21, 382/22, 16; 367/38, 50

[56] References Cited

U.S. PATENT DOCUMENTS

| | | | |
|---|---|---|---|
| 4,611,311 | 9/1986 | Frasier | 367/50 X |
| 4,633,400 | 12/1986 | Chittineni | 364/421 |
| 4,665,510 | 5/1987 | Foster et al. | 364/421 X |
| 4,686,657 | 8/1987 | Dellinges et al. | 364/421 |

Primary Examiner—Joseph Ruggiero
Assistant Examiner—Charles B. Myer

[57] ABSTRACT

A method for continuous velocity estimation of seismic data uses non-linear signal matching. Common depth point trace data is examined at selected offsets and non-linear signal matching is performed to derive moveout information from which the RMS and interval velocities may be further estimated. Non-linear signal matching for selected offsets of each CDP trace gather functions to derive characteristic match curve data at selected depths or travel time intervals. The match curve data inherently contains moveout information that relates to energy velocities for the particular trace position. Derived velocity data for selected time depths may then be output across a line of survey.

15 Claims, 9 Drawing Sheets

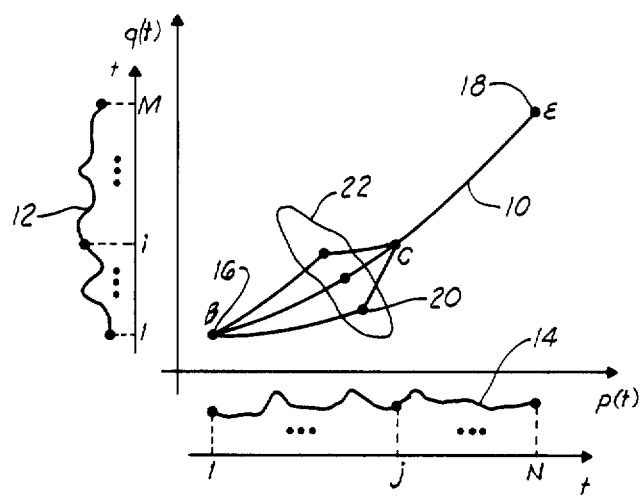
FIG. 1
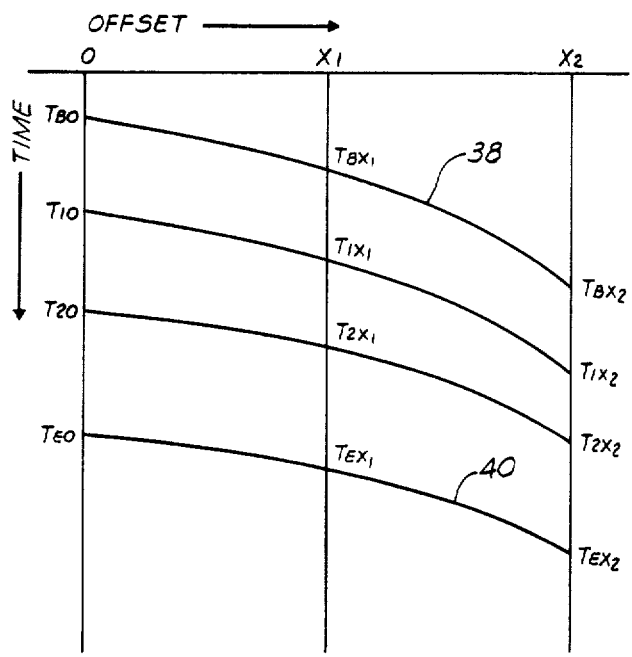
FIG. 4

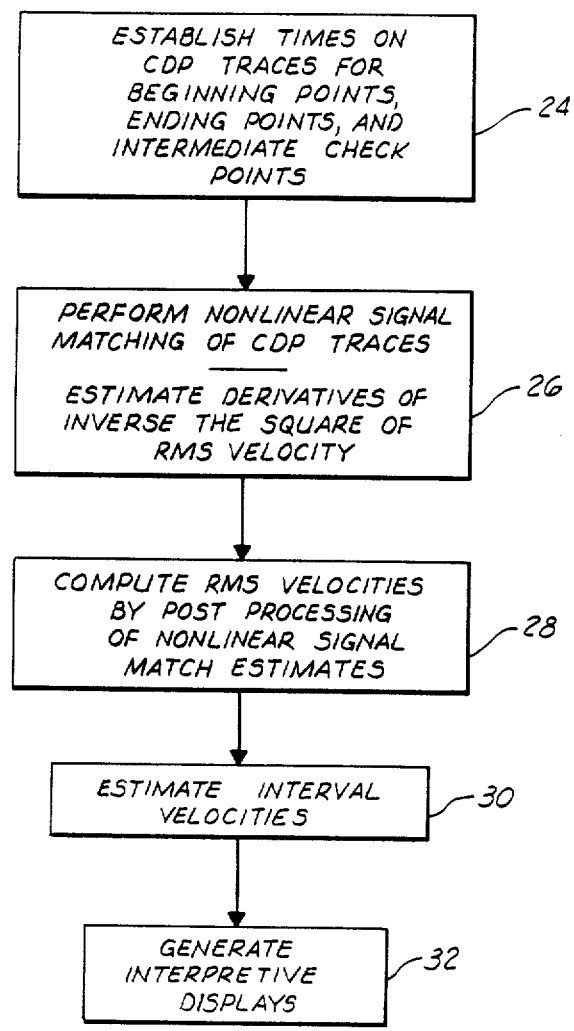

INSTANTANEOUS SLOPE ESTIMATES

| 0. | 0. | 0. | 0. |
|---|---|---|---|
| 0. | 0. | 0. | 0. |
| 0. | 0. | 0. | 0. |
| 0. | 0. | 0. | 0. |
| .877E+00 | .875E+00 | .874E+00 | .872E+00 |
| .870E+00 | .870E+00 | .870E+00 | .871E+00 |
| .873E+00 | .874E+00 | .875E+00 | .877E+00 |
| .876E+00 | .878E+00 | .880E+00 | .879E+00 |
| .880E+00 | .881E+00 | .880E+00 | .880E+00 |
| .862E+00 | .863E+00 | .863E+00 | .862E+00 |
| .867E+00 | .868E+00 | .872E+00 | .875E+00 |
| .870E+00 | .869E+00 | .868E+00 | .869E+00 |
| .873E+00 | .873E+00 | .877E+00 | .879E+00 |
| .901E+00 | .903E+00 | .909E+00 | .917E+00 |
| .937E+00 | .937E+00 | .938E+00 | .943E+00 |
| .945E+00 | .941E+00 | .937E+00 | .935E+00 |

RMS VELOCITY ESTIMATES

| | | | |
|---|---|---|---|
| .554E+04 | .555E+04 | .556E+04 | .557E+04 |
| .562E+04 | .563E+04 | .564E+04 | .565E+04 |
| .570E+04 | .571E+04 | .572E+04 | .573E+04 |
| .575E+04 | .576E+04 | .576E+04 | .576E+04 |
| .577E+04 | .577E+04 | .577E+04 | .577E+04 |
| .577E+04 | .577E+04 | .577E+04 | .577E+04 |
| .577E+04 | .577E+04 | .577E+04 | .577E+04 |
| .579E+04 | .579E+04 | .580E+04 | .580E+04 |
| .583E+04 | .583E+04 | .584E+04 | .584E+04 |
| .587E+04 | .588E+04 | .589E+04 | .589E+04 |
| .592E+04 | .593E+04 | .593E+04 | .594E+04 |
| .596E+04 | .596E+04 | .596E+04 | .597E+04 |
| .598E+04 | .598E+04 | .598E+04 | .598E+04 |
| .599E+04 | .599E+04 | .599E+04 | .600E+04 |
| .601E+04 | .601E+04 | .601E+04 | .602E+04 |
| .603E+04 | .603E+04 | .604E+04 | .604E+04 |
| .605E+04 | .605E+04 | .605E+04 | .605E+04 |
| .606E+04 | .606E+04 | .606E+04 | .606E+04 |
| .607E+04 | .607E+04 | .607E+04 | .607E+04 |
| .608E+04 | .608E+04 | .608E+04 | .609E+04 |
| .610E+04 | .610E+04 | .611E+04 | .611E+04 |
| .613E+04 | .613E+04 | .613E+04 | .613E+04 |
| .615E+04 | .615E+04 | .615E+04 | .615E+04 |

FIG. 10

INTERVAL VELOCITY ESTIMATES

| | | | |
|---|---|---|---|
| 0. | .718E+04 | .723E+04 | .729E+04 |
| .744E+04 | .663E+04 | .828E+04 | .103E+04 |
| .719E+04 | .719E+04 | .934E+04 | .912E+04 |
| .817E+04 | .794E+04 | .672E+04 | .723E+04 |
| .577E+04 | .577E+04 | .577E+04 | .577E+04 |
| .577E+04 | .577E+04 | .577E+04 | .577E+04 |
| .594E+04 | .670E+04 | .635E+04 | .716E+04 |
| .693E+04 | .806E+04 | .708E+04 | .831E+04 |
| .739E+04 | .879E+04 | .748E+04 | .702E+04 |
| .714E+04 | .669E+04 | .935E+04 | .776E+04 |
| .712E+04 | .786E+04 | .704E+04 | .884E+04 |
| .722E+04 | .713E+04 | .803E+04 | .784E+04 |
| .681E+04 | .635E+04 | .670E+04 | .644E+04 |
| .639E+04 | .754E+04 | .757E+04 | .757E+04 |
| .677E+04 | .758E+04 | .641E+04 | .794E+04 |
| .704E+04 | .704E+04 | .779E+04 | .694E+04 |
| .678E+04 | .670E+04 | .725E+04 | .720E+04 |
| .620E+04 | .631E+04 | .652E+04 | .618E+04 |
| .647E+04 | .694E+04 | .661E+04 | .720E+04 |
| .778E+04 | .783E+04 | .707E+04 | .802E+04 |
| .709E+04 | .664E+04 | .817E+04 | .726E+04 |
| .846E+04 | .732E+04 | .729E+04 | .801E+04 |
| .790E+04 | .786E+04 | .700E+04 | .760E+04 |
| .647E+04 | .673E+04 | .625E+04 | .632E+04 |

FIG. 11

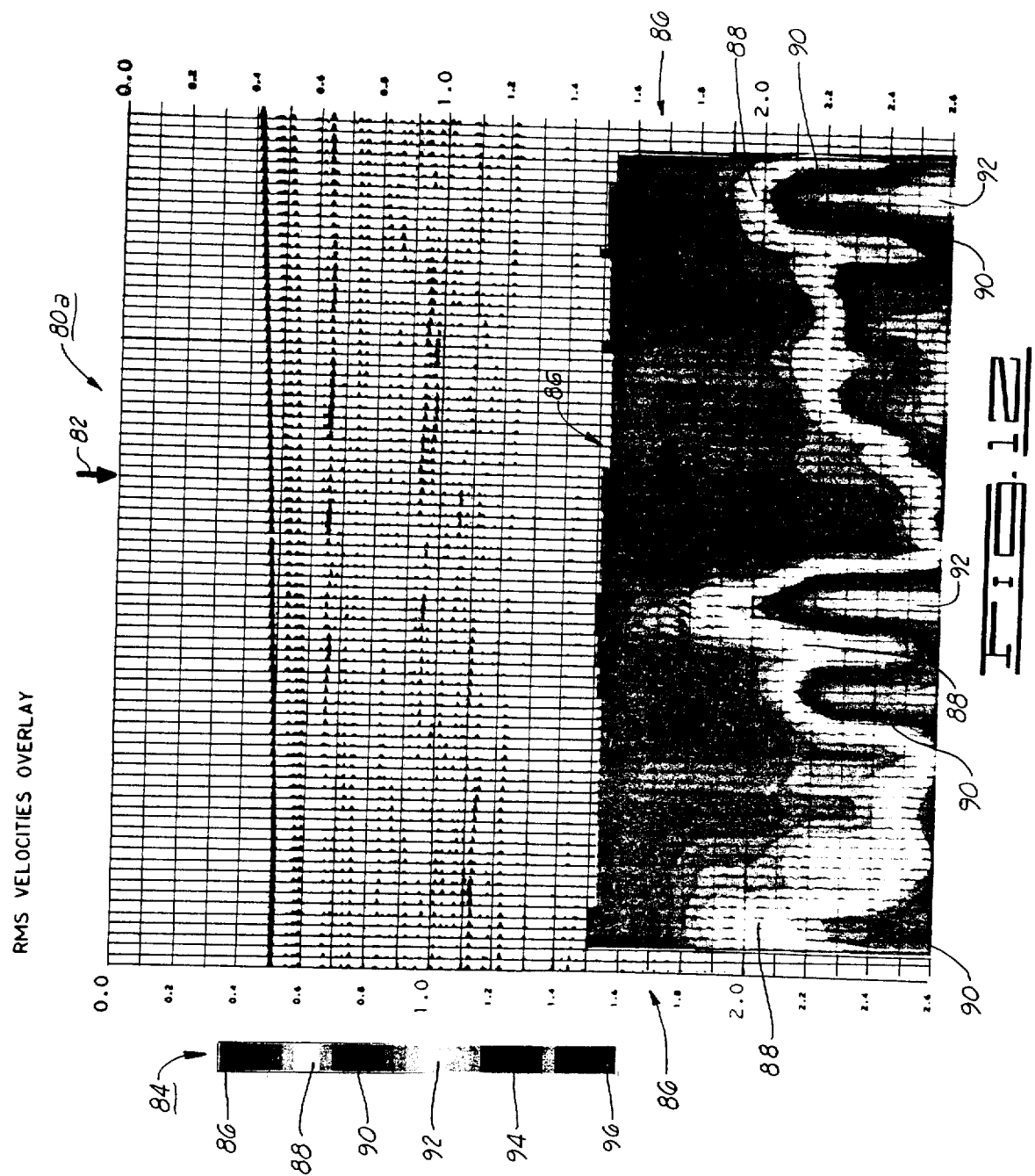

METHOD FOR CONTINUOUS ESTIMATION BY NON-LINEAR SIGNAL MATCHING OF SEISMIC TRACES

This is a continuation of application Ser. No. 831,382 filed Feb. 20, 1986, now abandoned.

BACKGROUND OF THE INVENTION

1. Field of the Invention

The invention relates to the digital signal processing of seismic data to perform certain pattern recognition techniques and, more particularly, but not by way of limitation, it relates to a process for extraction of the continuous RMS and interval velocities by examining the moveout information from common depth point traces at different offsets as measured by non-linear signal matching of selected individual traces.

2. Description of the Prior Art

The prior art methods for velocity analysis or estimation of continuous velocity determine measures of coherency, such as semblance as a function of time and velocity, as between selected seismic trace data of known offset relationship, and the velocities are then manually picked from an appropriate printout. A general discussion of the prior procedures appears in the publication "Interval Velocities From Seismic Reflection Time Measurements" - P. Hubral and T. Kray, Society of Exploration Geophysics Press, 1980. The seismic velocities can be estimated by exploiting two pieces of information, the change of reflectivity with offset, and the moveout information with offset. Most of the practical methods attempt to exploit the moveout information with offset due to the difficulties in implementation of the first mentioned procedure, i.e. attempting to establish change of reflectivity with offset. Prior methods compute contour plots of the semblance coherency measures and selected velocity relationships may then be manually picked by visual observation of the contour plots. Quantum jumps are usually made in both time and velocity variables in the computation of such contour plots. Such prior methods require an impractically large amount of computation in order to provide only poor resolution of continuous velocity estimation, and they require a considerable amount of manual involvement in order to estimate velocities for each basement point throughout the data compilation.

SUMMARY OF THE INVENTION

The present invention relates to a method for determining RMS and interval velocity data utilizing non-linear signal matching of common depth point trace data. The method functions to establish selected beginning, ending and intermediate times on the CDP trace group in preparedness for subsequent non-linear signal matching procedure. The routine then functions to estimate derivatives of inverse of the RMS velocity squared for subsequent computation of RMS velocities by post processing of the non-linear signal matching estimates. Given this data, the procedure then establishes an estimate for interval velocities and proceeds to generation of interpretive display, e.g. an output of the seismic section under investigation with multi-color overlay indicating the RMS or interval velocity data.

Therefore, it is an object of the invention to develop a technique for the high resolution estimation of elastic constants for an earth cross-section from multi-component, multi-sensor seismic data.

It is also an object of the invention to develop a computationally efficient process for estimation of continuous RMS and interval velocities from seismic trace data.

It is still further an object of the present invention to provide a method for determination of seismic trace data velocity relationships that are more accurate and better suited for use in related seismic processing operations such as normal moveout corrections, data migration, and the like.

Finally, it is an object of this invention to provide an automatic data processing technique for use with seismic section data that provides more accurate continuous velocity estimation.

Other objects and advantages of the invention will be evident from the following detailed description when read in conjunction with the accompanying drawings which illustrate the invention.

BRIEF DESCRIPTION OF THE DRAWINGS

FIG. 1 is a graphic illustration in idealized form showing a trace match curve indicative of path optimality with local constraints;

FIG. 2 is a general flow diagram illustrating the basic procedures of the present invention;

FIG. 4 is a graphic showing of moveout curves for increasing time and offset;

FIG. 10 is a typical data printout for RMS velocity estimates as obtained by non-linear signal matching of CDP traces;

FIG. 11 is a typical data printout of interval velocity estimates as obtained by non-linear signal matching of CDP traces;

FIG. 12 is a photographic reproduction of a data printout showing a processed seismic section with RMS velocities indicated in color overlay.

DETAILED DESCRIPTION OF THE INVENTION

Figure 3:
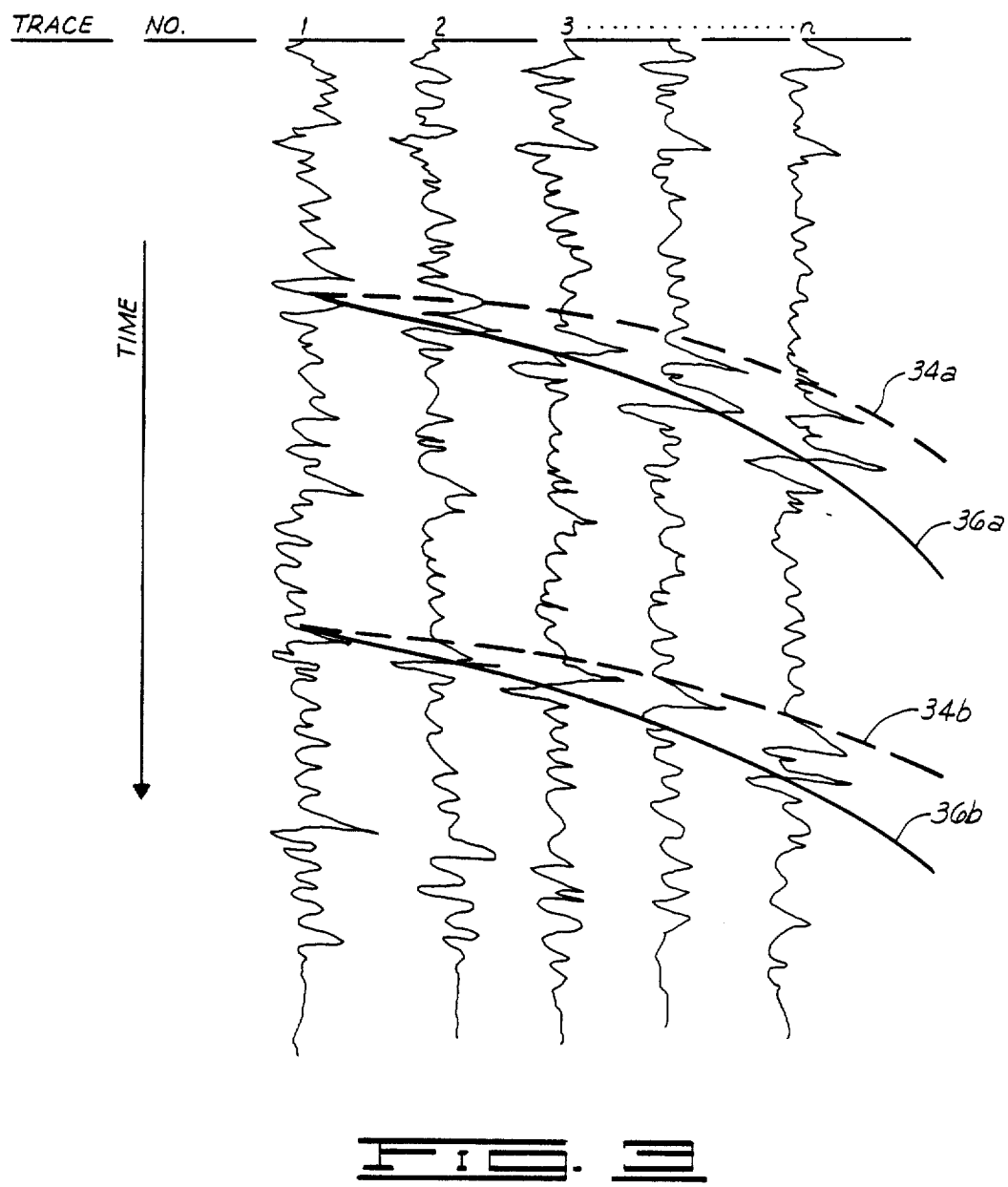
FIG. 3 is an idealized showing of plural seismic traces of known offset and time with time window designations.

In accordance with the stated objectives, the present invention must function to match common depth point traces of selected offsets as derived from a line of prestack data. Since the event spacings of traces at different offset positions will vary non-linearly with time, non-linear signal matching is performed to derive moveout information from which to further estimate the RMS and interval velocities. The velocities within the intervals defined by specific interfaces are called interval velocities. These intervals usually pertain to homogeneous stratum. The RMS velocity is defined as the square root of the average of travel time weighted squared interval velocities.

The method first establishes a criterion for signal matching. Consider common depth point traces $p_j(t)$ and $q_j(t)$, $1 \leq j \leq J$, at offsets $x_1$ and $x_2$ of J consecutive basement points, where $x_2$ is greater than $x_1$. The trace $q_j(t)$ is a non-linearly stretched version of the trace $p_j(t)$. The stretch function or match curve $\mu_j(t)$ that matches the trace $p_j(t)$ with the trace $q_j(t)$ contains the relative moveout information as between the traces at the respective offsets $x_1$ and $x_2$ of basement point j. Let $p_j(t)$ be modeled in terms of $q_j(t)$ as $$P_j(t) = q(\mu_j(t)) + e_j(t), j \epsilon J \tag{1}$$

where $e_j(t)$ is an additive noise term. Letting the term be gaussian with mean $\alpha_j$ and variance $\sigma_j^2$ as $$e_j(t) \sim N(\alpha_j, \sigma_j^2) \tag{2}$$

and if it is also independent from sample to sample and from trace to trace, the log likelihood function of the data can be written as $$L(\mu_j(t), \alpha_j, \sigma_j^2, j \epsilon J) = \tag{3}$$

$$- \sum_j \left[ n_j \log \sigma_j^2 + \frac{1}{2\sigma_j^2} \sum_t (e_j(t) - \alpha_j^2) \right] + \text{a constant}$$

where $n_j$ is the number of points on the match curve $\mu'_j(t)$. Differentiating L with respect to $\alpha_j$ and $\sigma_j$ and equating the resulting expressions to zero, we get $$\left. \begin{array}{l} \alpha_j = \frac{1}{n_j} \sum_t (e_j(t)) \\[6pt] \text{and } \sigma_j^2 = \frac{1}{n_j} \sum_t (e_j(t) - \alpha_j)^2 \end{array} \right\} \tag{4}$$

Substitution of equations (4) into equation (3) yields an expression for log likelihood function in terms of $\mu_j(t)$. That is, $$L1(\mu_j(t), j \epsilon J) = - \sum_j n_j \log \left[ \frac{1}{n_j} \sum_t (e_j(t) - \alpha_j)^2 \right] + \text{a constant} \tag{5}$$

The estimate of $\mu_j(t)$ maximizing equation (5) gives maximum likelihood estimate of the match curve. Since log is a monotonic function of its argument, assuming the match curve is constant over a small number of basement points, the u(t) that minimizes $\epsilon^2$, where $$\epsilon^2 = \frac{1}{n} \sum_j (e_j(t) - \alpha_j)^2 \tag{6}$$

yields a maximum likelihood estimate for the match curve $\mu(t)$. If n is the number of points on the match curve, and in particular, if we consider only one basement point, the criterion for the maximum likelihood estimate of $\mu(t)$ is given by the minimization of $\epsilon 2$, where $$\epsilon^2 = \frac{1}{n} \sum_t (e(t) - \alpha)^2 \tag{7}$$

FIG. 1 illustrates in idealized form the manner in which computationally efficient estimation of $\mu(t)$ or match curve 10 is effected from a consideration of non-linearly related traces 12 and 14, i.e. traces q(t) and p(t), respectively. Thus, if we place trace Q(t) 12 on the y-axis and trace p(t) 14 on the x-axis, and we know the samples of beinning point B 16 and the samples of ending point E 18 that match, then it can be postulated that any match curve 10 that goes through points 16 and 18 will define some stretch of one trace relative to the other. The matching of traces is equivalent to estimating a match curve $\mu(t)$ that is optimal with respect to the criterion of equation (7).

Estimation of the match curve 10 can also be viewed as finding an optimal path from the beginning point 16 to the ending point 18 by using the principle of path optimality. This may be stated as follows. If the optimal path from point B 16 to point C 18 goes through some intermediate point $a_j$, i.e. one of points 20 somewhere within bounds 22, then the optimal path from point B to point C, includes as a portion of it the optimal path from B to $a_j$, or from point 16 to some point 20. This principle can be used to propagate the path sequentially from the beginning point B 16 to the ending point E 18. If we let $\epsilon^2$ (B, C) be the minimum value of the criterion for the path from B to C, then by using the principle of path optimality it can be computed in terms of the paths from point 16 to 20 as follows.

$$\epsilon^2(B,C) = \min_{a_j} f(\epsilon^2(B, a_j), \epsilon^2(a_j, C) \tag{8}$$

The size and the shape of the local search region 22 containing the $a_j$ points 20 depend upon the apriori information that one has about the range of local slopes of the particular match curve.

FIG. 2 illustrates the basic steps that are performed in the present data processing method. Initially, flow stage 24 examines the input CDP trace data in order to establish times for beginning points, ending points and intermediate check points of a possible match curve. Flow stage 26 then performs non-linear signal matching of the collection of CDP trace data and this includes the function of estimating derivatives for the inverse of the square of the RMS velocity. The RMS velocities are then computed in flow stage 28 by post processing of the match estimates, and interval velocities are estimated by the procedure of flow stage 30 for subsequent generation of output display at stage 32.

Referring again to flow stage 24, selection of the end and check points on the CDP traces is done utilizing a semblance criterion to select the corresponding timings on the subject CDP traces for use as the end and check points in non-linear signal matching processing stage 26. Minimum and maximum velocities and velocity increment are selected by the process operator, and suitable time window is selected for semblance calculations on a near offset trace.

FIG. 3 illustrates in an idealized form the moveout of a time window for minimum and maximum velocities on a CDP gather. Thus, CDP traces 1 . . . n are shown in relative offset and, for a given event indication, the time window is defined as between the faster velocity moveout lines 34a, 34b and the slower velocity moveout lines 36a, 36b. Thus, the semblance or factor SMB in a time window may be defined as $$SMB = \frac{\sum_{i=1}^{m} \left| \sum_{j=1}^{N} S_i(j) \right|}{\sum_{i=1}^{m} \sum_{j=1}^{N} |S_i(j)|} \quad (9)$$

where $s_i(j)$ is the $i^{th}$ sample of the time window on the $j^{th}$ CDP trace. Let $x_i$ be the offset distance of the $i^{th}$ CDP trace with $x_1$ being that of the near offset trace. For any particular velocity V the corresponding time on the traces at offsets $x_1$ and $x_i$ are related as $$t_i^2 = t_1^2 + \frac{x_i^2 - x_1^2}{V^2} \quad (10)$$

A semblance factor is calculated for each velocity in the chosen velocity interval. The velocity corresponding to the maximum semblance value is then taken as an estimate of the velocity at the central point of the time window, and equation (10) is then used to find the corresponding times on the traces for subsequent use in non-linear signal matching. The check points are chosen near the dominant events in order to provide maximum resolution.

The process then moves to perform non-linear signal matching as in flow stage 26 (FIG. 2). The timings on the traces in a CDP gather at offsets 0, $x_1$ and $x_2$ are illustrated in FIG. 4. The curves represent variation with offset of the trace times at the beginning point $T_B$ as indicated by curve 38 through intermediate times to curve 40 at the ending point $T_E$. If these are the matched times, then the time at any offset can be used to reference the velocity. For example, it may be written $$v(T_{20}) = v(T_{2x1}) = v(T_{2x2}) \quad (11)$$

where $v(T_{20})$ is the RMS velocity at the zero offset time $T_{20}$.

Figure 5:
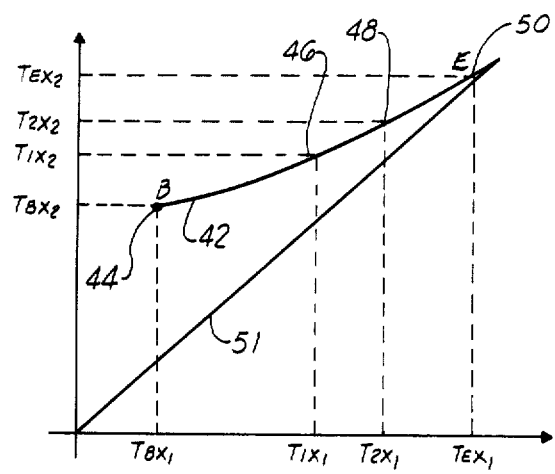
FIG. 5 is a graphic illustration of a match curve of CDP traces at different offsets.

FIG. 5 illustrates the general shape of a match curve 42 that was obtained by putting the trace at offset $x_1$ along the x-axis and the trace at offset $x_2$ along the y-axis, where $x_2$ is greater than $x_1$. At shallow depths, the velocity will be lower and hence there will be a greater moveout with the increase of the offset as indicated by the beginning point 44 whose ordinate is much longer than it's abscissa. Since, in general, the velocity will increase with depth, the moveout will be smaller with increase in time such that the ordinates of the points 46, 48 and 50 along match curve 42 will approach their abscissa. The slope of the match curve 42, starting with a low value, will approach unity (line 51) with the increase in time.

The match curve 42 possesses information about the relative travel times of the traces and hence information about the velocities. If the time $T_x$ at offset x and the time $T_o$ at zero offset are matched times, the relationship between $T_x$, $T_o$, the offset distance x and the RMS velocity $v(T_x)$ is given as $$T_x^2 = T_o^2 + x^2 u(T_x) \quad (12)$$

where $$u(T_x) = (1/v^2(T_x)) \quad (13)$$

Using equation (12), the times $T_{1x1}$, $T_{2x2}$ on the trace at offset $x_1$ can be written as $$T_{1x1}^2 = T_{10}^2 + x_1^2 u(T_{1x2}) \quad (14)$$

and $$T_{2x1}^2 = T_{20}^2 + x_1^2 u(T_{2x2}) \quad (15)$$

Subtraction of equation (14) from equation (15) yields $$(T_{2x1}^2 - T_{1x1}^2) = (T_{20}^2 - T_{10}^2) + x_1^2 u(T_{2x2}) - u(T_{1x2}) \quad (16)$$

Similarly, for the times on the trace at offset $x_2$ $$(T_{2x2}^2 - T_{1x2}^2) = (T_{20}^2 - T_{10}^2) + x_2^2 u(T_{2x2}) - u(T_{1x2}) \quad (17)$$

and subtracting equation (17) from equation (16), there derives $$(T_{2x1}^2 - T_{1x1}^2) = (T_{2x2}^2 - T_{1x2}^2) - (x_2^2 - x_1^2)(u(T_{2x2})) - u(T_{1x2})) \quad (18)$$

In equation (18), setting
$T_{2x2} \rightarrow T_{2x2} \rightarrow T_{x2}$ and $T_{2x2} \rightarrow T_{2x2} \rightarrow T_{x2}$ there is obtained $$\frac{\partial u}{\partial T_{x2}} = \frac{2(T_{x2} s(T_{x2}) - T_{x1})}{s(T_{x2})(x_2^2 - x_1^2)} \quad (19)$$

$$\text{where } s(T_{x2}) = \frac{(T_{2x2} - T_{2x2})}{(T_{2x1} - T_{1x1})} \bigg|_{\substack{T_{2x2} \rightarrow T_{1x2} \\ T_{2x1} \rightarrow T_{1x1}}} \quad (20)$$

$$\text{and } \frac{\partial u}{\partial T_{x2}} = \frac{(u(T_{2x2}) - u(T_{1x2}))}{(T_{2x2} - T_{1x2})} \bigg|_{T_{2x2} \rightarrow T_{1x2}} \quad (21)$$

Equation (19) relates the slope of the reciprocal of the square of the RMS velocity to the slope of the match curve, and to the matched times, and to the offset distances of the traces. If the RMS velocity increases with time, the quantity $$\frac{\partial u}{\partial T_{x2}}$$

will be less than zero. At any time (t), the variable u can estimated as $$u(t) = U(t_o) + \int_{t_o}^{t} \frac{\partial u}{\partial \xi} d\xi \quad (22)$$

Equation (13) can then be used to obtain estimates of the RMS velocities. The zero offset time can be estimated from the matched times of the traces at offset $x_1$ and offset $x_2$ as follows. From the moveout equation there is $$T_{x1}^2 = T_o^2 + x_1^2 / v^2(T_{x1}) \quad (23)$$

$$T_{x2}^2 = T_o^2 + x_2^2 / v^2(T_{x2}) \quad (24)$$

From equations (23 and 24), it may be derived that $$T_o^2 = \frac{(T_{x1}^2 x_2^2 - T_{x2}^2 x_1^2)}{(x_2^2 - x_1^2)} \quad (25)$$

Flow stage 28 (FIG. 2) then functions to effect post processing of the non-linear signal match estimates to derive continuous velocity extraction. The purpose of post processing is to minimize the estimation errors of signal matching and to constrain the estimated velocity values at the end and at the respective check points to the given values. The velocities are estimated in such a way that the abrupt discontinuities in the estimated values are minimized subject to the constraint that the estimated velocities agree with the values given at the ending and all check points.

Figure 6:
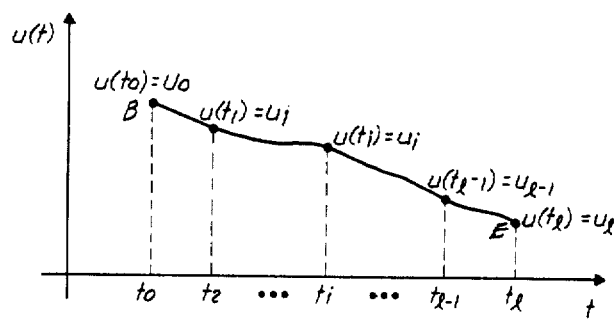
FIG. 6 is a graphic depiction illustrating the values of the variable u at the ends and check points of a match curve.

Let there be l-1 check points. The beginning point, the ending point and the intermediate check points are graphically illustrated in FIG. 6 for a typical representation of the curve u(t). Designate $t_o$ as the beginning time, $t_1$ the ending time, $\Delta t$ the sampling interval, and u'(t) the non-linear signal matching estimate of the derivative of u(t).

Further, if $u_{m_2}$ is the value of u(t) at time $(t_o+m_2\Delta t)$; and $n_i$ is set to the number of estimates of u'(t) in the time interval $t_{i-1}$ to $t_i$ (including $t_{i=1}$ but excluding $t_i$); and if û'(t) and û(t) are the estimates of u'(t) and u(t) that are obtained by post processing; then the quantities û'(t) and û(t) may be estimated using the relations $$u'(t_o + k\Delta t) = \sum_{j=-m_1}^{m_2} a_j u'(t_o + (k-j)\Delta t) \tag{26}$$

and $$u(t_o + r\Delta t) = u_{m_2} + \sum_{k=m_2}^{r-1} u'(t_o + k\Delta t)\Delta t \tag{27}$$

The coefficients $a_j$ are chosen so that the estimates û are constrained to the values given at the end and check points and further constrained so that they are smooth. If $$\eta_i = \sum_{r=1}^{i} \eta_r, \ 1 \leq i \leq l \tag{28}$$

then constraining of the u values at the end and the check points will yield the following set of equations $$HA = v \tag{29}$$

where for $-m_1 \leq j \leq m_2$ and $2 \leq i \leq l$, the elements of H and v are given by $$\begin{aligned} H(1,j) &= \sum_{k=m_2}^{n_1} u'(t_o + (k-j)\Delta t) \\ v_1 &= (u_1 - u_{m_2})/\Delta t \\ H(i,j) &= \sum_{k=1}^{n_i} u'(t_o + (\eta_{i-1} + k - j)\Delta t) \\ \text{and } v_i &= (u_i - u_{i-1})/\Delta t \end{aligned} \tag{30}$$

The smoothness of the estimated u values can be measured in terms of $\epsilon^2$, where $$\begin{aligned} \epsilon^2 &= \sum_{k=m_2+1}^{\eta_l+1-m_1} (u(t_o = k\Delta t) - u(t_o + (k-1)\Delta t))^2 \\ &= \sum_{k=m_2}^{\eta_l-m_1} (\Delta t)^2 (u'(t_o + k\Delta t))^2 \\ &= (\Delta t)^2 \sum_{k=m_2}^{\eta_l-m_i} \left( \sum_{j=-m_1}^{m_2} a_j u'(t_o + (k-j)\Delta t) \right)^2 \end{aligned} \tag{31}$$

If $$\epsilon_1^2 = \epsilon^2/(\Delta t)^2 \tag{32}$$

then equation (31) can be put into the matrix form as $$\epsilon_1^2 = A^T U A \tag{33}$$

where the (i, j)$^{th}$ element of the matrix U is given by $$U(i,j) = \sum_{k=m_2}^{\eta_l-m_1} u'(t_o + (k-i)\Delta t)u'(t_o + (k-j)\Delta t) \tag{34}$$

$$-m_1 \leq i, j \leq m_2$$

The coefficient vector A that minimizes $\epsilon_1^2$ of equation (33) subject to the constraints of equation (29) can be obtained as $$A = U^{-1}H^T(HU^{-1}H^T)^{-1}v \tag{35}$$

The u values are estimated as $$u(t_o + r\Delta t) = u_{m_2} + \sum_{k=m_2}^{r-1} \sum_{j=-m_1}^{m_2} a_j u'(t_o + (k-j)\Delta t)\Delta t) \tag{36}$$

Estimation of the interval velocities is carried out in flow stage 30 (FIG. 2) as the RMS velocity is related to the interval velocities of the respective subterranean earth layers and the respective layer travel times as follows $$V_{RMS}^2(n) = \frac{\left( \sum_{i=1}^{n} v_i^2 t_i \right)}{\left( \sum_{i=1}^{n} t_i \right)} \tag{37}$$

where $V_i$ and $t_i$ are the interval velocity and one way travel times of earth layer i, and $V_{RMS}$ is the RMS velocity up to the layer n. From equation (37), the DIX equation, the interval velocity of layer n can be written as $$V_n^2 = \frac{[V_{RMS}^2(n)T_o(n) - V_{RMS}^2(u-1)T_o(n-1)]}{2t_n} \tag{38}$$

where $T_o(n) = \sum_{i=1}^{n} t_i$ \hfill (39)

Figure 7:
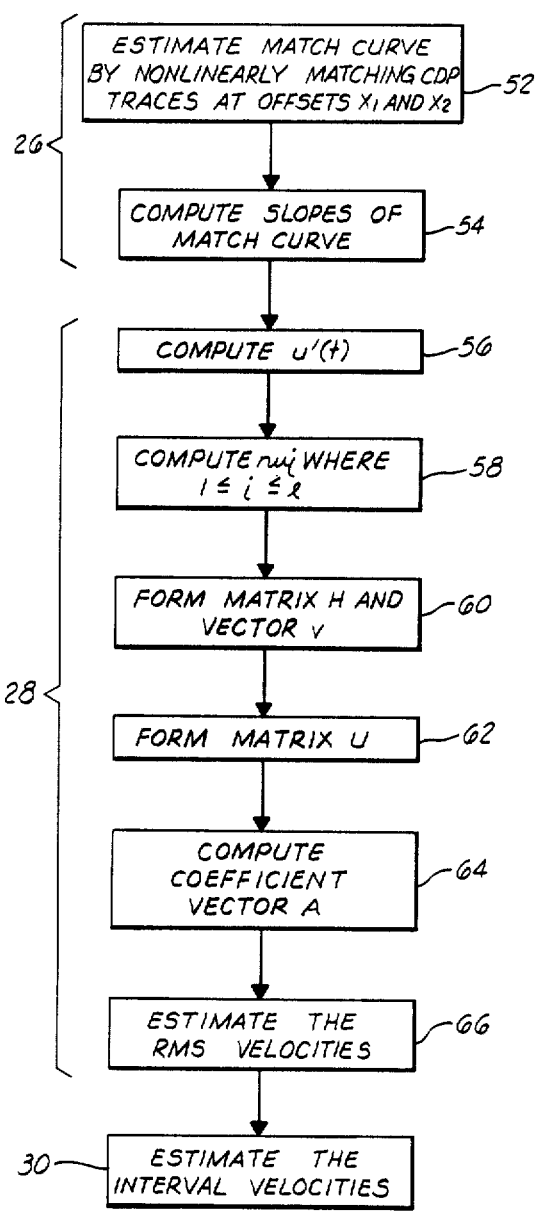
FIG. 7 is a flow diagram showing the computational flow steps for the continuous estimation of velocities.

The computations of flow stages 26, 28 and 30 of the flow chart of FIG. 2 are further illustrated in the flow chart of FIG. 7. Thus, the match curve estimate is made in flow stage 52 and the match curve slopes are determined in flow stage 54. The flow stage 28 (FIG. 2) consists of a multiple of individual routines as u'(t) and $\eta l_i$ are determined in flow stages 56 and 58. The matrix H is then formed in stage 60, as at equations (29 and 30), and the matrix U is derived in stage 62 as per equations (33 and 34). The co-efficient vector A (equation 35) is determined in flow stage 64, and the RMS velocities are then finally estimated in stage 66. Flow stage 30 then functions to estimate the interval velocities in accordance with the functions of equations (37 through 39).

Figures 8, 9:
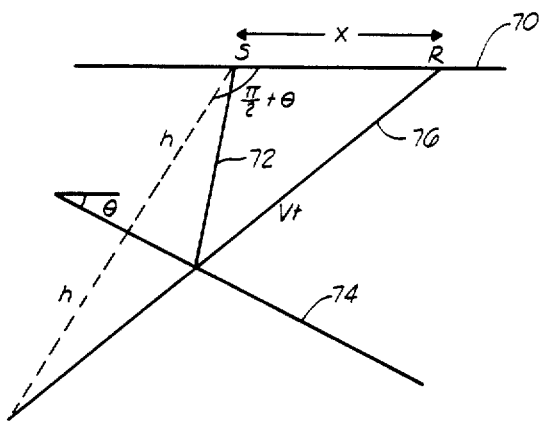
FIG. 8 is an idealized illustration showing normal moveout estimation for the case of dipping reflectors.
FIG. 9 is a typical data printout for instantaneous slope estimates of a match curve.

The velocity estimates are considerably affected by the effects of dip in the reflected horizons. FIG. 8 illustrates the relationship and parameters to be considered for normal moveout estimation for dipping strata. Energy from source S at earth surface 70 is directed along ray path 72 to be reflected at dipping bed 74 for return along path 76 to receiver point R on surface 70. Thus, from the relationships of FIG. 8, it can be written $$(vt)^2 = 4h^2 + x^2 - 4hx \cos(\pi/2 + \theta) \quad (40)$$

Rearranging equation (40), there is obtained $$t^2 = t_o^2 + \frac{x^2}{v^2} + 2t_o \frac{x\sin\theta}{v} \quad (41)$$

and using equation (41) while proceeding similar to equation (19), it may be stated as check points, were estimated initially using semblance criterion.

FIG. 9 illustrates computer printout information for the instantaneous slope estimates of a typical match curve as determined at flow stage 54 (FIG. 7). The data values are read sequentially horizontally across the rows and vertically down the columns row by row, and it can be generally discerned that the slopes of the match curve data start with a lower value and increase with increasing time approaching unity at the trace ending point.

FIG. 10 shows the printout data for the RMS velocity estimates for the same data. The RMS velocities are determined in flow stage 66 which essentially functions around the evaluation of equation (36). Finally, the printout data of FIG. 11 illustrates the interval velocity estimates as determined in flow stage 30 (FIG. 7), such $$2T_{x2} - \frac{2T_{x1}}{s(T_{x2})} = (x_2^2 - x_1^2)\frac{\partial u}{\partial T_{x2}} + 2\sin\theta(x_2 - x_1)\left[\left(\frac{T_{20}}{v(T_{20})} - \frac{T_{10}}{v(T_{10})}\right)(T_{2x2} - T_{1x2})\right]\bigg|_{T_{2x2} \to T_{1x2} \to T_x} \quad (42)$$

If the changes in the velocities are small compared to the changes in the square of the velocities, the last term of equation (42) can be neglected. Then equation (42) reduces to equation (19).

The zero offset time with dip can be estimated as follows. Letting $T_{x1}$, $T_{x2}$, and $T_o$ be the matched times; then for the case of dipping beds, using equation (41), it can be written that $$T_{x1}^2 = T_o^2 + \frac{x_1^2}{v^2(T_o)} + 2T_o\frac{x_1\sin\theta}{v(T_o)} \quad (43)$$

and $$T_{x2}^2 = T_o^2 + \frac{x_2^2}{v^2(T_o)} + 2T_o\frac{x_2\sin\theta}{v(T_o)} \quad (44)$$

From equations (43) and (44), there obtains $$T_o = \frac{v^2(T_o)(T_{x2}^2 - T_{x1}^2) - (X_2^2 - x_1^2)}{2v(T_o)\sin\theta(x_2 - x_1)} \quad (45)$$

Thus, knowing $T_{x1}$ and $T_{x2}$, the calculation of $T_o$ involves the angle of dip; however, if we use one trace at offset zero, and the other trace at offset $x_1$, the calculations are essentially independent of dip to a first order approximation.

FIGS. 9 through 13 illustrate output results of the present method as utilized in a specific seismic application. A group of common depth point data as derived from a marine survey was the subject matter. The seismic survey data consisted of 81 CDP gathers, of forty-eight fold redundancy, and the data was processed to provide estimation of RMS and interval velocities. For the 81 CDP gathers, signal match traces were selected centering on offsets 3 and 24 of each DCP gather, this providing a significant and ample offset spacing. Thus, trace data at offset 3 and the trace data at two offsets on each side thereof were processed on the x-axis, and five offset traces centering on offset 24 were processed on the y-axis in order to establish match curve information for the respective CDP group using non-linear signal matching. The matched times at the beginning of the traces, end of traces, and for each of two intermediate interval velocity data being estimated utilizing equations (38 and 39).

The estimated RMS and interval velocities can then be used to generate displays of color overlays on seismic sections. Such displays then allow the interpreter to delineate the potential hydrocarbon traps through deduction. That is, any lithologic unit has a characteristic rock velocity which will remain constant until either the rock composition changes or until its porosity varies. A change in rock composition or porosity will be revealed by a change in transit time, i.e. the interval velocity for the stratum. The individual lithologies or porosity changes can be outlined by contouring the boundaries at the top and base of each member that has a velocity that contrasts with that of an adjacent member.

FIG. 12 is a seismic compressional wave section 80a wherein the RMS velocity data is displayed by means of color overlay. The section 80a shows the eighty-one CDP gathers in equal spacing across the survey line from left to right, and this survey passed through a well position 82 which proved to be a gaseous but non-commercial well. The color scale 84 progresses from 5500 feet per second through 7000 feet per second in color gradation as follows: blue-86, light blue-88, green-90, yellow-92, red-94 and indigo-96. Thus, the color overlay for RMS velocities of FIG. 12 shows largely blue-86 in the upper regions above a generally light blue-88 line. The lower regions thereunder range from green-90 to yellow-92. Since the gas zone will usually have a low interval velocity, it can be noted beneath well position 82 that the blue-86 portion extends nearly to the bottom of the seismic section 80, i.e. down to about 2.4 seconds travel time. Keep in mind that seismic event data is also present for visual interpretation with the color representation.

Figure 13:
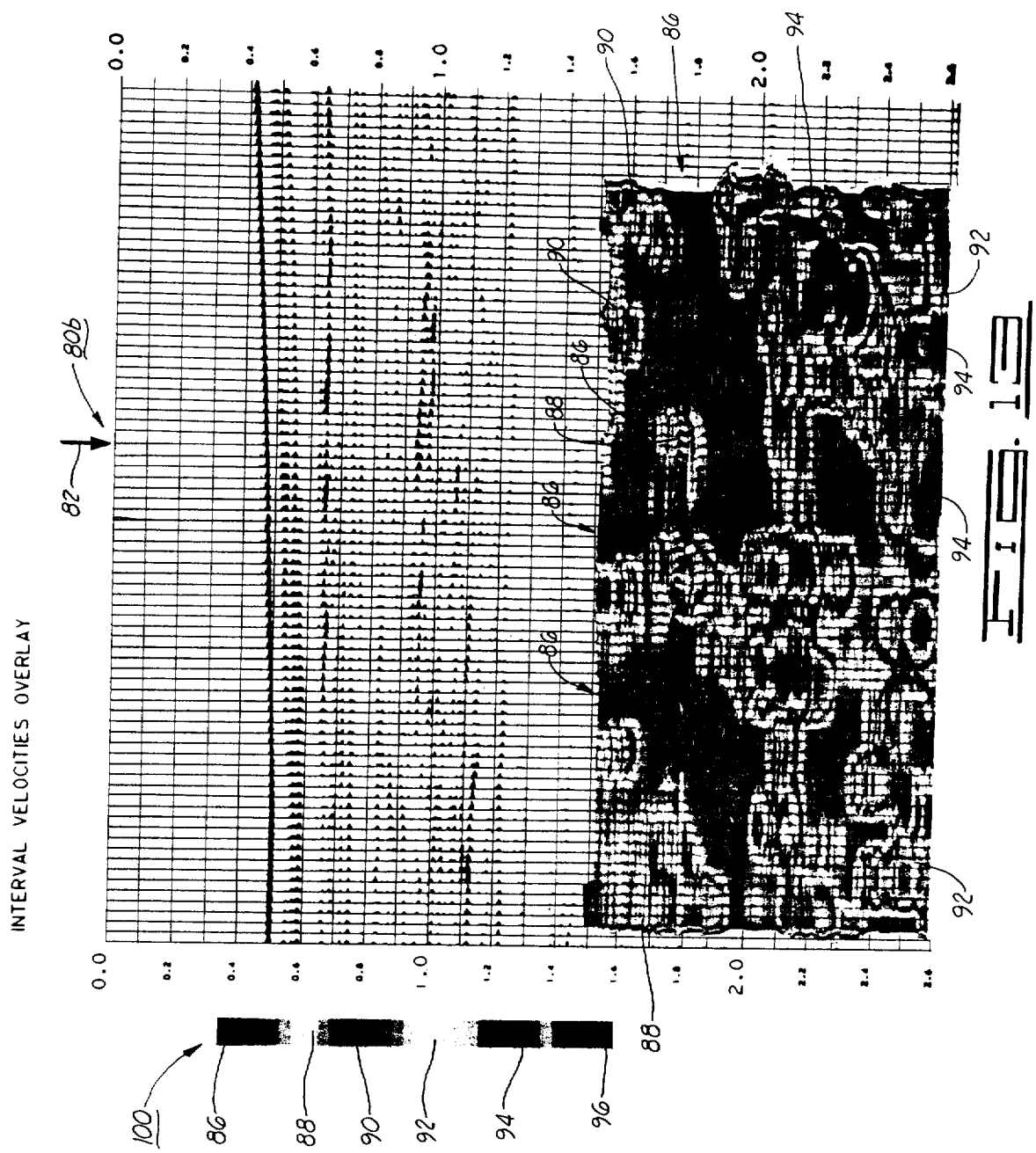
FIG. 13 is a photographic reproduction of trace data for the same seismic section with interval velocities illustrated in color overlay.

FIG. 13 illustrates the same seismic section 80b as it includes a color overlay indicating interval velocities. In this case, the color scale 100 from blue to indigo extends from 5500 feet per second to 9500 feet per second. The color overlay from about 1.5 seconds through 2.6 seconds travel time is again largely blue-86 with increased interval velocity zones showing up as light blue-88 intermixed with greens-90, yellow-92 and reds-94. It also may be noted beneath well position 82 a region of low interval velocity as indicated by blue-86 with a bright spot light blue-88 indication overlying concise events in the vicinity, i.e. at about 1.8 seconds. This is a classic gas zone indicator as high porosity is evidenced. Lower strata shows scattering of higher velocity structure by presence of yellows, reds and indigo.

The foregoing discloses a novel method for processing of seismic data whereby velocity analysis is effected relatively faster over a section of seismic data. The present invention enables not only the better and more complete derivation of respective RMS and interval velocities, but also the enhanced interpretive tool consisting of the color overlayed seismic section wherein the velocity relationships are denoted. The method utilizes non-linear signal matching to establish a common match curve relationship that is a basic function of all traces of the section, and it brings a new tool to the geophysicist for evaluating seismic data in order to better identify subsurface structures.

Changes may be made in the combination and arrangement of steps as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. A method for determining a continuous velocity for the propagation of acoustic seismic pulses through subsurface formations in a system where acoustic pluses are generated by a seismic source transmitted into the earth, reflected back by interfaces, detected by seismic pulse receivers and converted to electrical signals representing a series of sequentially detected acoustic pulses, said method including the steps of:
   receiving signals representing detected acoustic pulses;
   selecting signals representing acoustic pulses having a common reflection midpoint between a seismic source and a seismic pulse receiver;
   determining a beginning point, intermediate points and an end point for each selected signal;
   estimating non-linear signal match curves for said selected signals;
   calculating derivatives of the inverse of the square of the root mean square velocity of the acoustic pulses represented by each said selected signal;
   computing root mean square velocities of the acoustic pulses by integrating said derivatives;
   estimating interval velocities for the acoustic pulses between interfaces;
   establishing a continuous velocity for the acoustic pulses; and
   displaying said estimated interval velocities.

2. The method according to claim 1 wherein said estimating non-linear signal match curves step includes the steps of:
   non-linearly matching signals having common reflection midpoints at selected offset valves; and
   computing the slope of each match curve.

3. The method according to claim 1 wherein said computing root mean square velocities step includes the steps of:
   determining slopes for said signal match curves between predetermined points of said signal matching estimate;
   forming a coefficient matrix and a vector representing changes of the square of the inverse of the root mean square velocity with respect to time;
   calculating a matrix representing the correlation of the derivative of said square of the inverse of said root mean square velocity; and
   computing a coefficient vector representing weight values for a constraining parameter.

4. The method according to claim 1 wherein said computing step includes adding constraints of known velocity information.

5. A method as set forth in claim 1 wherein:
   said root mean square velocities are root mean square seismic velocities.

6. A method as set forth in claim 1 which further includes:
   processing the root mean square velocities over a predetermined interval to determine respective interval velocity estimates.

7. A method as set forth in claim 1 wherein said step of computing root mean square velocities includes:
   determining successive slopes for the signal match curve over a time interval; and
   relating said successive slopes to estimate the successive derivative values for the inverse of the square of the root mean square velocities.

8. A method as set forth in claim 1 wherein said step of computing root mean square velocities includes:
   applying selected constraints to the estimated velocities at each of the end and intermediate check points thereby to minimize the estimation errors in signal matching.

9. A method as set forth in claim 1 which is further characterized in that:
   the steps of receiving, selecting, determining, estimating and computing are carried out for a succession of signals representing common depth point trace data gathers that extend over a selected line of a survey; and
   interval velocities estimated are for the selected interval across the line of survey.

10. A method as set forth in claim 9 wherein:
    said estimated interval velocities are presented in differential color display of the time interval extending across the line of survey.

11. A method as set forth in claim 10 wherein:
    said differential color display is presented in time coincident overlay with a selected display mode of seismic section data.

12. A method as set forth in claim 9 which further includes:
    processing the root mean square velocity of the acoustic pulses over said interval to determine respective interval velocity estimates; and
    outputting signals indicating interval velocity estimates along time intervals of each of said successive trace data gathers.

13. A method as set forth in claim 12 wherein:
    said signals indicating interval velocity estimates is presented in differential color display of the time interval extending across the line of survey.

14. A method as set forth in claim 13 wherein:
    said differential color display is presented in time coincident overlay with a selected display mode of seismic section data.

15. A method as set forth in claim 1 wherein:
    said estimated interval velocities are presented in differential color display of the time interval.

* * * * *